(12) United States Patent
Minegishi

(10) Patent No.: US 9,880,792 B2
(45) Date of Patent: Jan. 30, 2018

(54) MANAGEMENT SYSTEM, INFORMATION PROCESSING DEVICE, AND MANAGEMENT METHOD

(71) Applicant: Youichi Minegishi, Kanagawa (JP)

(72) Inventor: Youichi Minegishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/068,437

(22) Filed: Mar. 11, 2016

(65) Prior Publication Data

US 2016/0274851 A1 Sep. 22, 2016

(30) Foreign Application Priority Data

Mar. 20, 2015 (JP) ................................. 2015-058509
Jan. 28, 2016 (JP) ................................. 2016-014019

(51) Int. Cl.
*G06F 15/00* (2006.01)
*G06F 3/12* (2006.01)

(52) U.S. Cl.
CPC .......... *G06F 3/1225* (2013.01); *G06F 3/1204* (2013.01); *G06F 3/1285* (2013.01)

(58) Field of Classification Search
CPC ..... G06F 3/1293; G06F 3/1211; G06F 3/1225
USPC ...................................................... 358/1.15
See application file for complete search history.

(56) References Cited

U.S. PATENT DOCUMENTS

| 8,726,370 | B2 | 5/2014 | Minegishi | |
| 2008/0007758 | A1* | 1/2008 | Miyashita | G06F 21/629 358/1.14 |
| 2009/0128843 | A1* | 5/2009 | Lao | G06F 3/1205 358/1.15 |
| 2009/0217161 | A1 | 8/2009 | Minegishi | |
| 2012/0254898 | A1* | 10/2012 | Nakata | G06F 9/4411 719/324 |

FOREIGN PATENT DOCUMENTS

JP 2002-334047 11/2002

\* cited by examiner

*Primary Examiner* — Saeid Ebrahimi Dehkord
(74) *Attorney, Agent, or Firm* — Cooper & Dunham LLP

(57) ABSTRACT

A management system includes: a setting unit that performs administrator setting; a storage unit that stores therein administrator setting information, program information specifying a program corresponding to an image processing device, and customization information indicating how to change a setting of the program in accordance with an administrator setting; a generation unit that generates a program file based on the administrator setting information and the program information, and generates a customization file based on the administrator setting information and the customization information; and an installation control unit that installs the program in an information processing device based on the program file, and changes the setting of the program to adapt to the administrator setting based on the customization file.

9 Claims, 14 Drawing Sheets

FIG.4

SELECT PC IN WHICH PROGRAM IS TO BE INSTALLED

| PC NAME | IP ADDRESS | COMMENT |
|---------|------------|---------|
| PC A | 10.20.30.3 | |
| PC B | 10.20.30.4 | |
| PC C | 10.20.30.5 | TEST PC |
| PC D | 10.20.30.6 | |

OK  CANCEL

FIG.5

```
<?xml version="1.0" encoding="utf-8"
<dependency>
    <installsoftware>
        <colorbwlimit=="none">
            <require softwarename="ColorProfileEditTool"/>
        </colorbwlimit>
        <require softwarename="PrinterDriver"/>
    </installsoftware>
    <driversettings>
        <colorbwlimit=="blackonly">
            <customize>
                <featurelock>
                    <item name="Colorbw"fixvalue="black"/>
                </featurelock>
            </customize>
        </colorbwlimit>
    </driversettings>
</dependency>
```

71 — installsoftware block
72 — driversettings block

FIG.6

```
<?xml version="1.0" encoding="utf-8"
<installsoftware>
        <require softwarename="PrinterDriver"/>
</installsoftware>
```
⌐75A

FIG.7

```
<?xml version="1.0" encoding="utf-8"
<customize>
        <featurelock>
                <item name="colorbw"fixvalue="black"/>
        </featurelock>
</customize>
```
⌐81A

FIG.8

```
                                              ┌75B
<?xml version="1.0" encoding="utf-8"
<installsoftware>
        <require softwarename="ColorProfileEditTool"/>
        <require softwarename="PrinterDriver"/>
</installsoftware>
```

FIG.9

```
                              ┌81B
<?xml version="1.0" encoding="utf-8"
<customize>
</customize>
```

FIG.10

```
POST/10.20.30.3/HTTP/1.1
Host: localhost
User-Agent: Client
Accept:
text/xml,application/xml,application/xhtml+xml,text/html;q=0.9,text/plain;q=0.8,image/png,*/
*;q=0.5
Accept-Language: ja,en-us;q=0.7,en;q=0.3
Accept-Encoding: gzip,deflate
Accept-Charset: Shift_JIS,utf-8;q=0.7,*;q=0.7
Keep-Alive: 300
Connection: keep-alive
Content-Type: text/plain
Content-Length: xxxx <?xml version="1.0" encoding="utf-8"
<installsoftware>
        <require softwarename="ColorProfileEditTool"/>
        <require softwarename="PrinterDriver"/>
</installsoftware>
....
```

FIG.11

| PnP | PRINTER DRIVER |
|---|---|
| PRINTER MODEL A | DRIVER FOR PRINTER MODEL A |
| PRINTER MODEL B | DRIVER FOR PRINTER MODEL B |

CHECK PROGRAM TO BE INSTALLED.

|  | SOFTWARE NAME | VERSION | RELEASE DATE |
|---|---|---|---|
| ✓ | PRINTER DRIVER | 1.2.0.0 | 2013/12/1 |
| ✓ | COLOR PROFILE EDIT CONTROL | 1.0.0.0 | 2012/1/24 |

OK          CANCEL

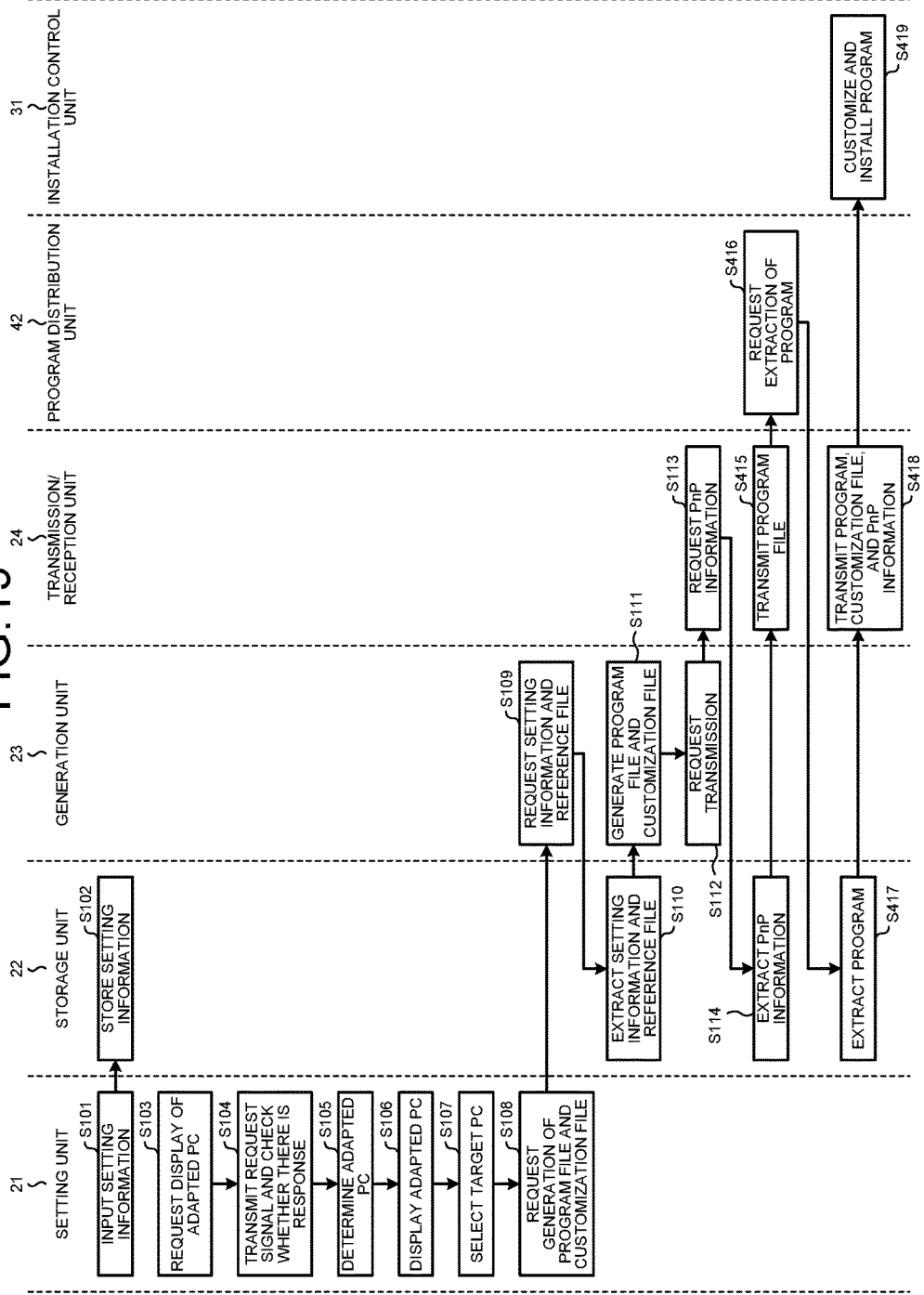

MANAGEMENT SYSTEM, INFORMATION PROCESSING DEVICE, AND MANAGEMENT METHOD

CROSS-REFERENCE TO RELATED APPLICATIONS

The present application claims priority to and incorporates by reference the entire contents of Japanese Patent Application No. 2015-058509 filed in Japan on Mar. 20, 2015 and Japanese Patent Application No. 2016-014019 filed in Japan on Jan. 28, 2016.

BACKGROUND OF THE INVENTION

1. Field of the Invention

The present invention relates to a management system, an information processing device, a server, a management method, and a management program.

2. Description of the Related Art

In a system including an image processing device such as a printer, a copying machine, or a multifunction peripheral, and an information processing device such as a personal computer (PC), typically, a driver for controlling the image processing device and a program such as accessory software for supporting image processing are installed in the information processing device. In this case, a setting of the program to be installed is required to be adjusted in accordance with use environment.

For example, to enable a large number of users to extract content set by one user, known is a driver including, among a group of driver configuration files before installation, a driver initialization file, the text of which can be edited, for controlling a setting of the driver after installation, (Japanese Laid-open Patent Publication No. 2002-334047).

In the system as described above, an administrator setting (for example, prohibition of color printing) may be performed in the image processing device for limiting an executable function of the image processing device. When such an administrator setting is performed, a setting of a program to be installed in each information processing device is required to be changed to adapt to the administrator setting. Such a change in the setting of the program depends on an operation performed by a user of the information processing device in many cases.

There is a need to adapt the setting of the program to be installed in the information processing device to the administrator setting performed in the image processing device without putting an operational burden on the user.

SUMMARY OF THE INVENTION

It is an object of the present invention to at least partially solve the problems in the conventional technology.

According to an embodiment, a management system includes an image processing device and an information processing device in which a program for generating print data to be transmitted to the image processing device is to be installed, the management system comprising: a setting unit that performs setting for limiting an executable function of the image processing device; a storage unit that stores therein administrator setting information indicating content of the setting, program information indicating the program corresponding to the image processing device based on the administrator setting information, and customization information indicating how to change the setting of the program in accordance with the administrator setting information; a generation unit that generates a program file designating the program to be installed in the information processing device based on the administrator setting information and the program information, and generates a customization file specifying the setting of the program designated by the program file based on the administrator setting information and the customization information; and an installation control unit that installs the program in the information processing device based on the program file, and performs setting of the program based on the customization file.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a PC selection screen for allowing an administrator to select a PC in which a program is to be installed;

FIG. 5 is a diagram illustrating a reference file;

FIG. 6 is a diagram illustrating a program file according to a first example;

FIG. 7 is a diagram illustrating a customization file according to the first example;

FIG. 8 is a diagram illustrating a program file according to a second example;

FIG. 9 is a diagram illustrating a customization file according to the second example;

FIG. 10 is a diagram illustrating a POST message;

FIG. 11 is a diagram illustrating a correspondence table representing a correspondence relation between PnP information and a driver;

FIG. 12 is a diagram illustrating a program selection screen;

FIG. 19 is a flowchart illustrating a processing procedure of the management system according to the fourth embodiment.

DETAILED DESCRIPTION OF THE PREFERRED EMBODIMENTS

The following describes embodiments of a management system, an information processing device, a server, a management method, and a management program with reference to the attached drawings.

First Embodiment

Figure 1:
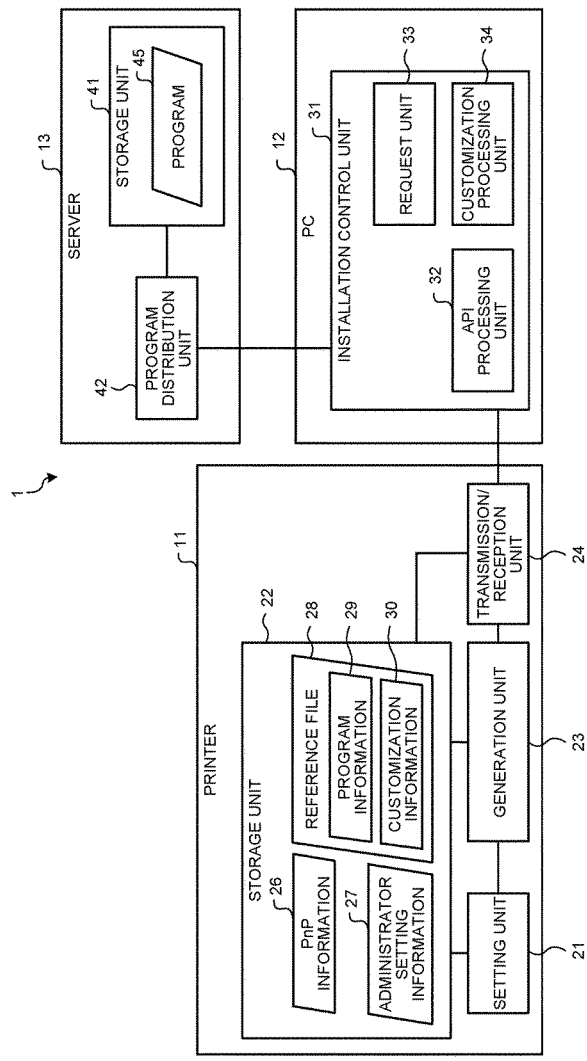
FIG. 1 is a diagram illustrating a functional configuration of a management system according to a first embodiment.

FIG. 1 is a diagram illustrating a functional configuration of a management system 1 according to a first embodiment. The management system 1 includes a printer (image processing device) 11, a PC (information processing device) 12, and a server 13. The printer 11 and the PC 12, and the PC 12 and the server 13 are connected with each other via a network such as a local area network (LAN) and the Internet.

In this example, one printer 11, one PC 12, and one server 13 are provided. However, the embodiment is not limited thereto. For example, a plurality of PCs 12 may be connected to one printer 11, or a plurality of printers 11 may be connected to one PC 12. A plurality of servers 13 may be provided. The printer 11 may be connected to the server 13 via a network.

The printer 11 is a device that prints character data, image data, and the like generated by the PC 12 on a medium such as a paper sheet. The printer 11 includes a setting unit 21, a storage unit 22, a generation unit 23, and a transmission/reception unit 24.

The setting unit 21 performs processing through which an administrator performs administrator setting for limiting an executable function of the printer 11. Examples of the administrator setting include prohibition, permission, and constraint on color printing, duplex/intensive printing, test printing, confidential printing, a toner save mode, and other settings. The setting unit 21 performs processing through which the administrator selects the PC 12 in which a program 45 such as a driver and accessory software is to be installed. The accessory software is, for example, software for supporting image processing, image editing, and other operations. The setting unit 21 is configured, for example, by utilizing an operation unit including a display, an input key, and other interfaces that can be operated by the administrator, a central processing unit (CPU) for performing information processing, a logic circuit, and other components.

The storage unit 22 stores therein Plug and Play (PnP) information (identification information) 26, administrator setting information 27, and a reference file 28. The PnP information 26 is information used for processing of specifying the printer 11, the processing conforming to a protocol of an application programming interface (API), and includes a model name, a serial number, a device identification (ID), a product ID, and a vendor ID, for example. The administrator setting information 27 is information that indicates content of the administrator setting set through the setting unit 21. The reference file 28 is information that prescribes a rule about the program 45, a rule about a setting change of the program 45, and other items, and includes program information 29 and customization information 30. The program information 29 is information that specifies accessory software and a driver corresponding to the printer 11. The customization information 30 is information that indicates how to change the setting of the program 45 to be installed in the PC 12 in accordance with administrator information. The storage unit 22 is, for example, configured by utilizing a storage device such as a flash memory, a static random access memory (SRAM), and a hard disk drive (HDD).

The generation unit 23 generates a program file based on the administrator setting information 27 and the program information 29, and generates a customization file based on the administrator setting information 27 and the customization information 30. The program file is information that designates the program 45 to be installed in the PC 12. The customization file is information that specifies how to change the setting of the program 45 designated by the program file. The generation unit 23 may be, for example, configured by utilizing a CPU and a logic circuit.

The transmission/reception unit 24 performs information transmission processing between the storage unit 22 and the generation unit 23, and information transmission processing between the printer 11 and the PC 12. The transmission/reception unit 24 is, for example, configured by utilizing a CPU, an internal bus, and an input/output (I/O) port.

The PC 12 includes an installation control unit 31. The installation control unit 31 performs, for example, processing of recognizing the connected printer 11, processing of acquiring the program 45, processing of installing the acquired program 45, and processing of changing the setting of the program 45. The installation control unit 31 includes an API processing unit 32, a request unit 33, and a customization processing unit 34.

The API processing unit 32 performs processing of activating a function of the PC 12 in response to a request from the printer 11. For example, the API processing unit 32 causes the installation control unit 31 to perform processing of downloading the program 45 from the server 13, processing of installing the program 45, and processing of changing the setting of the program 45 in response to a request signal transmitted from the transmission/reception unit 24 of the printer 11.

The request unit 33 performs processing of requesting the server 13 to allow download of the program 45. The request unit 33 generates a request signal of request to download the program 45 designated by the program file that is generated by the generation unit 23 of the printer 11.

The customization processing unit 34 performs processing of changing the setting of the downloaded program 45 to adapt to the administrator setting. The customization processing unit 34 performs processing of changing the setting of the program 45 to adapt to the administrator setting in installing the program 45 or after installing the program 45 in response to specification by the customization file generated by the generation unit 23 of the printer 11.

The installation control unit 31 is, for example, configured by utilizing a CPU, software that causes the CPU to perform processing of the installation control unit 31 (including processing performed by the API processing unit 32, the request unit 33, and the customization processing unit 34), and a logic circuit. The software that causes the CPU to perform the processing of the installation control unit 31 is preferably resident software that is always activated on an operating system (OS) of the PC 12.

The server 13 includes a storage unit 41 and a program distribution unit 42. The storage unit 41 stores therein various programs 45 corresponding to various printers 11. The storage unit 41 is, for example, configured by utilizing a storage device such as an SRAM, a flash memory, and an HDD. The program distribution unit 42 performs processing of extracting a predetermined program 45 from the storage unit 41 in response to the request signal transmitted from the PC 12, and performs processing of transmitting the extracted program 45 to the PC 12 as a response to the request signal.

The program distribution unit 42 is, for example, configured by utilizing a CPU and a logic circuit.

Figure 2:
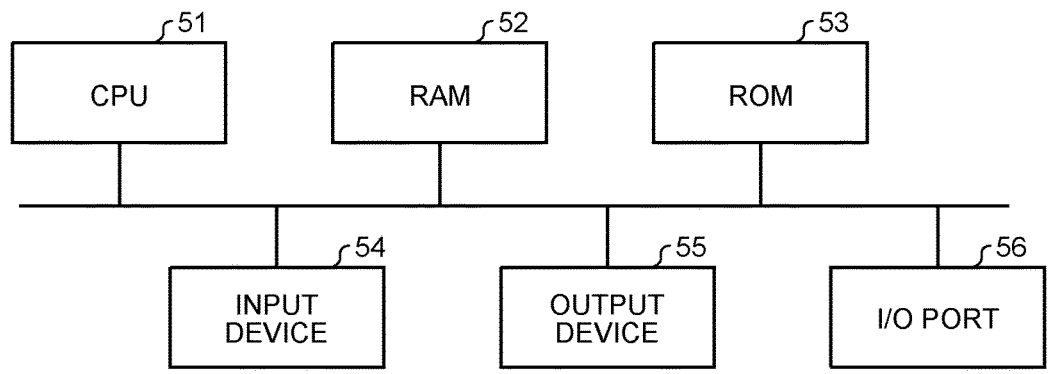
FIG. 2 is a diagram illustrating a hardware configuration of a PC and a server.

FIG. 2 is a diagram illustrating a hardware configuration of the PC 12 and the server 13. The PC 12 and the server 13 include a CPU 51, a random access memory (RAM) 52, a read only memory (ROM) 53, an input device 54, an output device 55, and an I/O port 56. The ROM 53 of the PC 12 stores therein software (resident software) that causes the CPU 51 to perform processing of the installation control unit 31. The printer 11 includes a device for performing printing processing, a device for conveying a medium, and other components in addition to the hardware configuration illustrated in FIG. 2.

Figure 3:
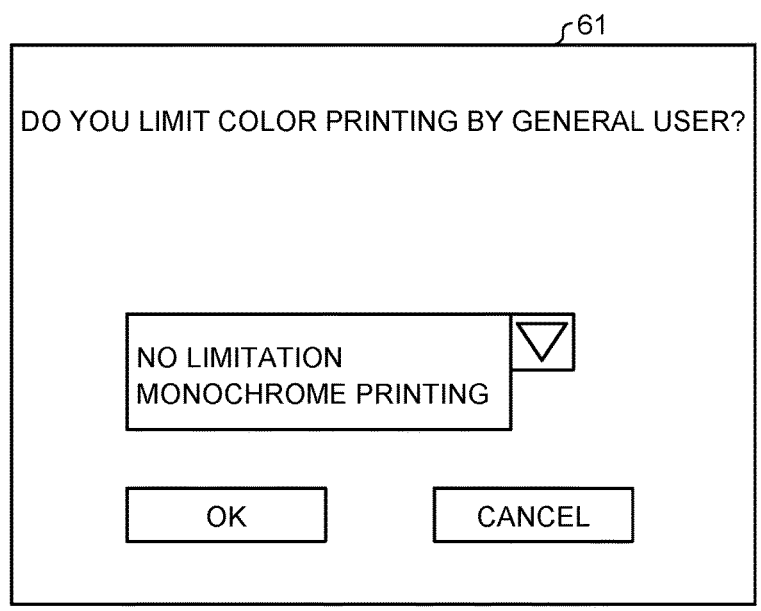
FIG. 3 is a diagram illustrating an administrator setting screen for performing administrator setting.

FIG. 3 is a diagram illustrating an administrator setting screen 61 for performing administrator setting. The administrator setting screen 61 is, for example, displayed on a display device arranged in the printer 11, and can receive a touch panel operation, a key input operation, and other operations performed by the administrator. In this example, displayed is a situation of setting whether to prohibit color printing (to force monochrome printing).

FIG. 4 is a diagram illustrating a PC selection screen 65 for allowing the administrator to select the PC 12 in which the program 45 is to be installed. Similarly to the administrator setting screen 61, for example, the PC selection screen 65 is also displayed on the display device and the like arranged in the printer 11, and can be operated by the administrator. In this example, displayed is a situation for selecting one or more PCs 12 from among four PCs 12 (PCs A to D) in which the program 45 can be installed.

FIG. 5 is a diagram illustrating the reference file 28. The reference file 28 is used to generate the program file and the customization file. The reference file 28 includes program information 71 that specifies the program 45 adapting to the printer 11 in which the reference file 28 is stored, and customization information 72 that indicates how to change the setting of the program 45 in accordance with the administrator setting. An installsoftware tag included in the program information 71 defines a software name that specifies the program 45 to be installed in the printer 11. A driver-settings tag included in the customization information 72 defines how to change the setting of the program 45 for each piece of content of the administrator setting. In this example, when the content of the administrator setting is "monochrome printing only", that is, "blackonly", it is defined that a set value "colorbw" of the program 45 is changed to "black". Similarly, a method of changing the set value is defined for each piece of content (for example, duplex printing) of the administrator setting.

FIG. 6 is a diagram illustrating a program file 75A according to a first example. The program file 75A is generated by the generation unit 23 based on the administrator setting information 27 and the program information 71. The program file 75A in this example designates the program 45 to be installed in a case in which the administrator setting is "monochrome printing only". This example indicates that the program 45 (driver) having a software name of "PrinterDriver" will be installed.

FIG. 7 is a diagram illustrating a customization file 81A according to the first example. The customization file 81A is generated by the generation unit 23 based on the administrator setting information 27 and the customization information 72. The customization file 81A in this example specifies a method of changing the setting of the program 45 in a case in which the administrator setting is "monochrome printing only". This example indicates that the set value "colorbw" of the program 45 will be changed to "black".

FIG. 8 is a diagram illustrating a program file 75B according to a second example. The program file 75B in this example designates the program 45 installed when the administrator setting is "(color printing is) not limited". This example indicates that the program 45 having a software name of "ColorProfileEditTool" (for example, accessory software that implements a function of adjusting a color tone and other parameters is assumed) will be installed in addition to the program 45 (driver) having the software name of "PrinterDriver" illustrated in FIG. 6.

FIG. 9 is a diagram illustrating a customization file 81B according to the second example. The customization file 81B in this example indicates a method of changing the setting of the program 45 in a case in which the administrator setting is "(color printing is) not limited". This example indicates that the set value of the program 45 will not be changed.

The program files 75A and 75B and the customization files 81A and 81B are transmitted together with the PnP information 26, as Post files, from the transmission/reception unit 24 of the printer 11 to the API processing unit 32 of the PC 12. FIG. 10 is a diagram illustrating a POST message 95. This example presents the POST message 95 in the hypertext transfer protocol (HTTP), but the embodiment is not limited thereto. For example, data may be transmitted by placing "?" after a uniform resource locator (URL) in a GET message.

When receiving the POST message 95 from the transmission/reception unit 24, the API processing unit 32 causes the installation control unit 31 to perform processing for installing the program 45. The API processing unit 32 causes the request unit 33 to perform processing of requesting the server 13 to allow download of the program 45 designated by the program files 75A and 75B. The program distribution unit 42 of the server 13 extracts the adapted program 45 in response to the request signal from the request unit 33, and distributes the program 45 to the PC 12. Subsequently, the API processing unit 32 causes the customization processing unit 34 to perform processing of changing the setting of the downloaded program 45 as specified by the customization files 81A and 81B.

FIG. 11 is a diagram illustrating a correspondence table 101 representing a correspondence relation between the PnP information 26 and the program 45. The installation control unit 31 determines the program 45 to be installed by utilizing such a correspondence table 101.

Before the program 45 is downloaded, the installation control unit 31 may perform processing of causing the display device included in the PC 12 to display a predetermined program selection screen, and causing a user to select the program 45 to be installed. FIG. 12 is a diagram illustrating a program selection screen 105. In this example, "Color Profile Edit Control" as accessory software can be selected in addition to "Printer Driver" as a basic driver of the printer 11.

Figure 13:
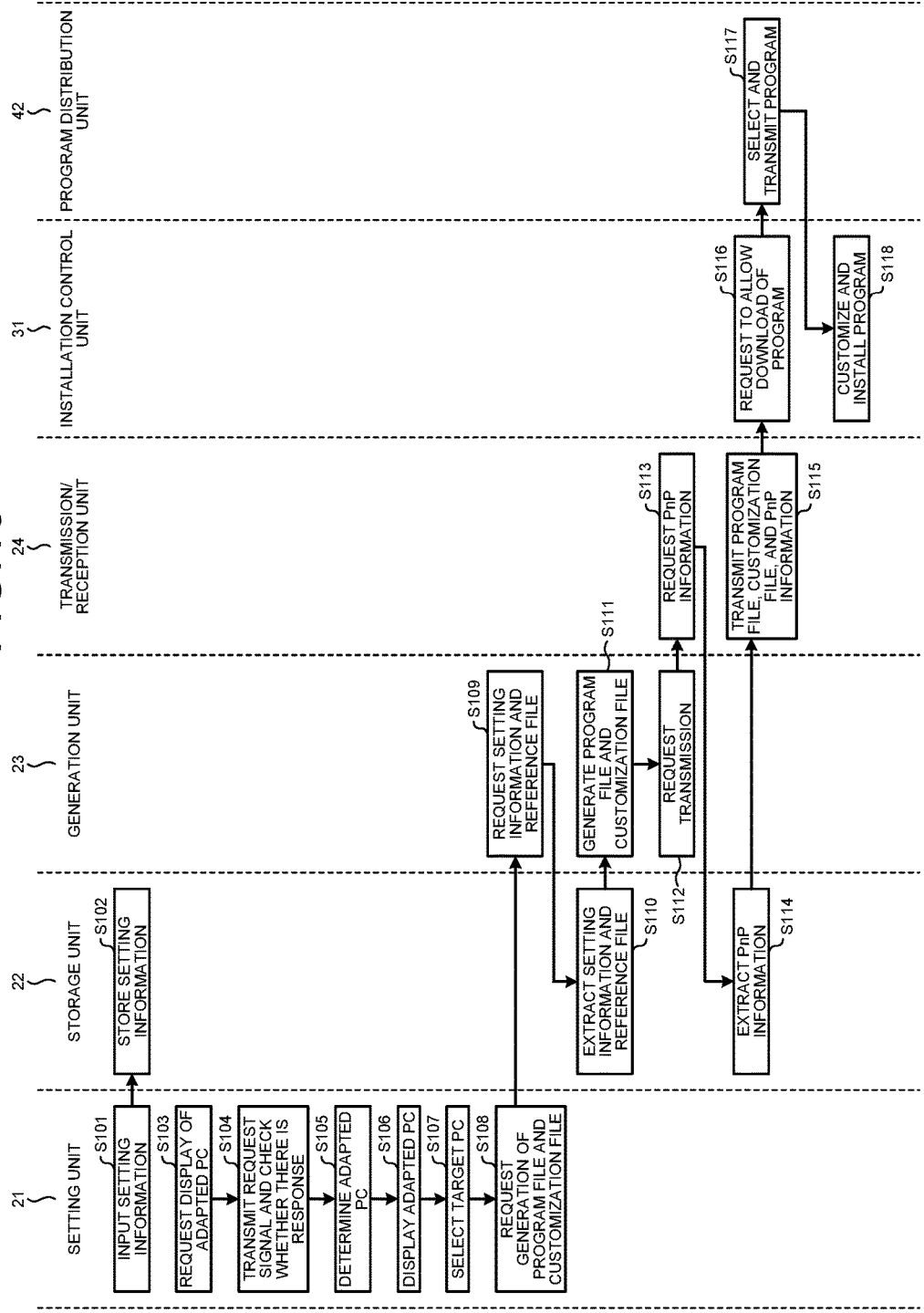
FIG. 13 is a flowchart illustrating a processing procedure of the management system according to the first embodiment.

FIG. 13 is a flowchart illustrating a processing procedure of the management system 1 according to the first embodiment. First, when the administrator operates the setting unit 21 (for example, a display device having an input function) included in the printer 11 to input the administrator setting such as limitation on color printing (S101), the administrator setting information 27 indicating the content of the administrator setting is stored in the storage unit 22 (S102).

Subsequently, when the administrator inputs an operation of requesting the setting unit 21 to display an adapted PC (adapted information processing device) (S103), the setting unit 21 transmits the request signal to each PC 12 connected to the printer 11, and checks whether there is a response (S104). The adapted PC is the PC 12 in which software (resident software) for implementing processing of the installation control unit 31 has been installed among one or more PCs 12 connected to the printer 11. The PC 12 in which the resident software has been installed transmits a response signal in response to the request signal from the setting unit 21. By contrast, the PC 12 in which the resident software is not installed does not transmit the response signal in response to the request signal from the setting unit 21. The setting unit 21 determines the adapted PC among the connected PCs 12 based on whether there is a response to the request signal (S105), and displays the PC selection screen 65 (FIG. 4) including a list of adapted PCs (S106).

Subsequently, when the administrator selects a target PC (target information processing device) from the PC selection screen 65 (S107), the setting unit 21 performs processing of requesting generation of the program files 75A and 75B and the customization files 81A and 81B (S108). The target PC is one or more PCs 12 included in the adapted PCs, and is the PC 12 in which the program 45 is to be installed and the setting of the program 45 is required to be changed to adapt to the administrator setting.

When receiving the request signal from the setting unit 21, the generation unit 23 performs processing of extracting the administrator setting information 27 and the reference file 28 from the storage unit 22 (S109), and the storage unit 22 extracts the administrator setting information 27 and the reference file 28 (S110). The generation unit 23 generates the program files 75A and 75B and the customization files 81A and 81B based on the administrator setting information 27 and the reference file (S111), and makes a request to transmit the files to the PC 12 (target PC) (S112).

When receiving the request signal from the generation unit 23, the transmission/reception unit 24 performs processing of extracting the PnP information 26 from the storage unit 22 (S113), and the storage unit 22 extracts the PnP information 26 (S114). The transmission/reception unit 24 transmits the program files 75A and 75B, the customization files 81A and 81B, and the PnP information 26 to the installation control unit 31 of the PC 12 (S115).

The installation control unit 31 of the PC 12 (target PC) performs processing of requesting the program distribution unit 42 of the server 13 to allow download of the program 45 based on the received program files 75A and 75B (S116). The program distribution unit 42 selects the program 45 stored in the storage unit 41 in response to the request signal from the installation control unit 31, and transmits the program 45 to the installation control unit (S117). The installation control unit 31 performs processing of installing the downloaded program 45, and changing the setting of the program 45 to adapt to the administrator setting based on the customization files 81A and 81B (S118).

With the configuration described above, the setting of the program 45 to be installed in the PC 12 can be adapted to the administrator setting performed in the printer 11 without putting an operational burden on the user.

The following describes other embodiments with reference to the drawings. However, a component that exhibits the same or similar working effect or a component that plays the same or similar role as that in the first embodiment may be denoted by the same reference numeral, and redundant description will not be repeated in some cases.

Second Embodiment

Figure 14:
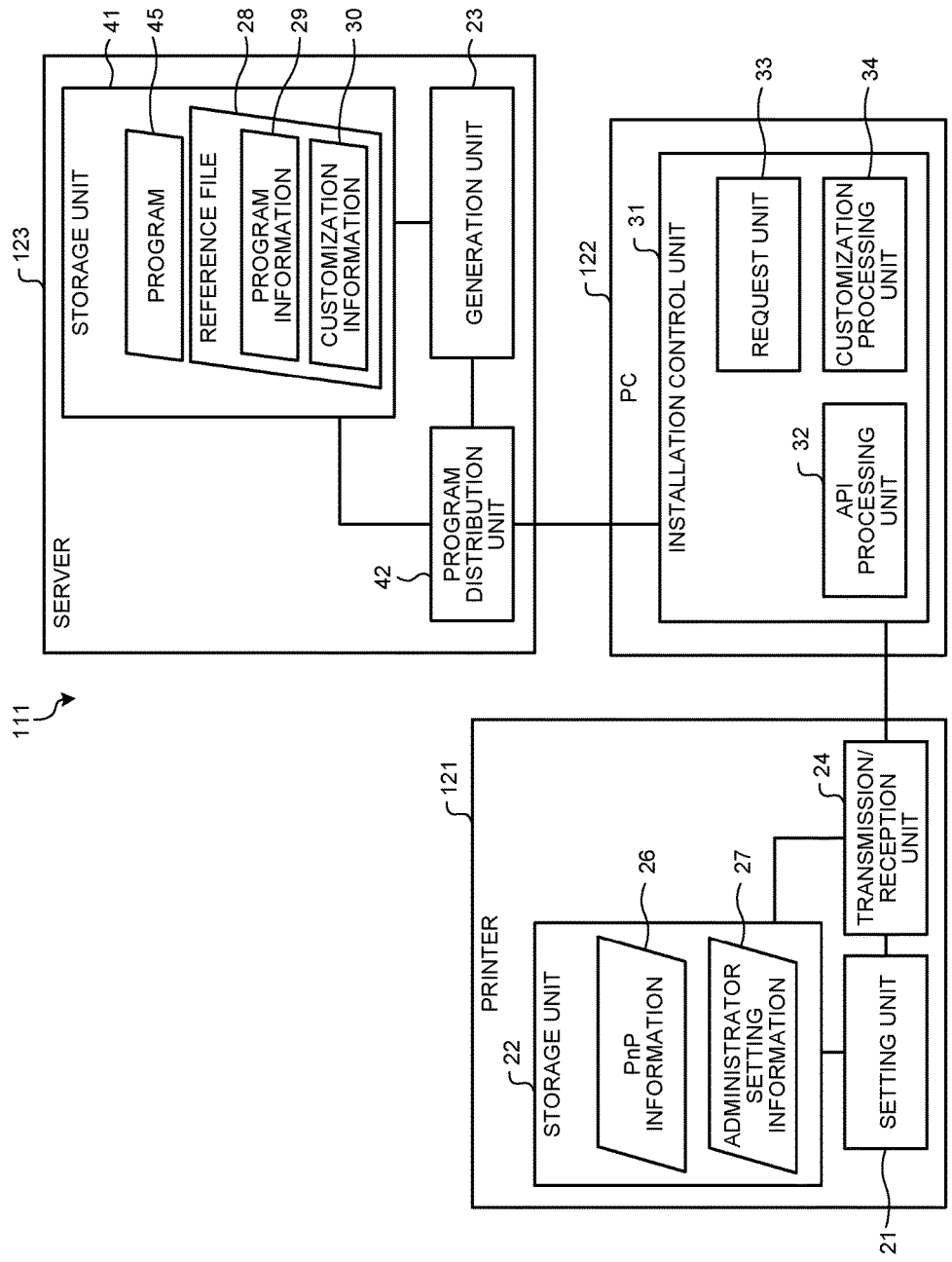
FIG. 14 is a diagram illustrating a functional configuration of a management system according to a second embodiment.

FIG. 14 is a diagram illustrating a functional configuration of a management system 111 according to a second embodiment. In this embodiment, the reference file 28 is stored in the storage unit 41 (second storage unit) of a server 123, and the generation unit 23 is included in the server 123. That is, in this embodiment, the program files 75A and 75B and the customization files 81A and 81B are generated in the server 123.

Figure 15:
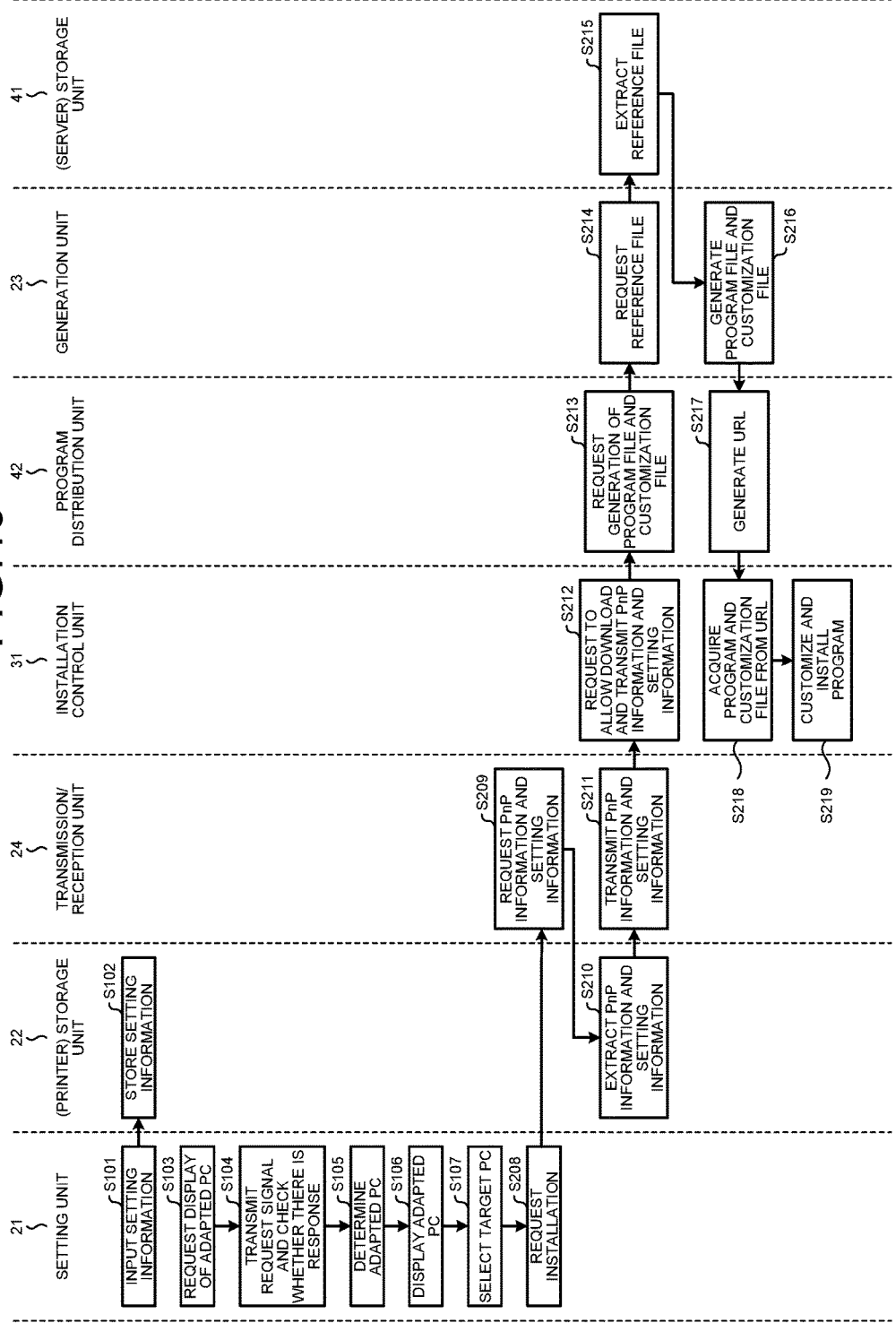
FIG. 15 is a flowchart illustrating a processing procedure of the management system according to the second embodiment.

FIG. 15 is a flowchart illustrating a processing procedure of the management system 111 according to the second embodiment. Steps S101 to S107 are the same as those in the first embodiment illustrated in FIG. 13.

After selecting the target PC (S107), the setting unit 21 performs processing of requesting each PC 122 as the target PC to install the program 45 (S208). When receiving the request signal from the setting unit 21, the transmission/reception unit 24 performs processing of extracting the PnP information 26 and the administrator setting information 27 from the storage unit 22 (first storage unit) of a printer 121 (S209), and the storage unit 22 extracts the PnP information 26 and the administrator setting information 27 (S210). The transmission/reception unit 24 transmits the PnP information 26 and the administrator setting information 27 to the installation control unit 31 of the PC 122 (S211).

When receiving the PnP information 26 and the administrator setting information 27 from the transmission/reception unit 24, the installation control unit 31 performs processing of requesting the program distribution unit 42 of the server 123 to allow download of the program 45 and performs processing of transmitting the PnP information 26 and the administrator setting information 27 to the program distribution unit 42 of the server 123 (S212). When receiving a signal from the installation control unit 31, the program distribution unit 42 performs processing of requesting generation of the program files 75A and 75B and the customization files 81A and 81B (S213).

When receiving the request signal from the program distribution unit 42, the generation unit 23 performs processing of extracting the reference file 28 from the storage unit 41 of the server 123 (S214), and the storage unit 41 extracts the reference file 28 (S215). The generation unit 23 generates the program files 75A and 75B based on the administrator setting information 27 and the program information 29 included in the reference file 28, generates the customization files 81A and 81B based on the administrator setting information 27 and the customization information 30 included in the reference file 28 (S216), and outputs the program files 75A and 75B and the customization files 81A and 81B to the program distribution unit 42.

The program distribution unit 42 generates a URL for downloading the program 45 and the customization files 81A and 81B based on the program files 75A and 75B and the customization files 81A and 81B (S217), and transmits the URL to the installation control unit 31 of the PC 12.

The installation control unit 31 acquires the program 45 and the customization files 81A and 81B from the received URL (S218), changes the setting of the program 45 to adapt to the administrator setting based on the customization files 81A and 81B, and installs the program 45 (S219).

As in this embodiment, even with the configuration in which the server 123 has a function of generating the program files 75A and 75B and the customization files 81A and 81B, the setting of the program 45 to be installed in the PC 122 can be adapted to the administrator setting performed in the printer 121 without putting an operational burden on the user. Furthermore, according to the embodiment, the program information 29 and the customization information 30 can be managed by the server 123 similarly to the program 45, so that updating work and the like for the program information 29 and the customization information 30 can be easily performed.

Third Embodiment

Figure 16:
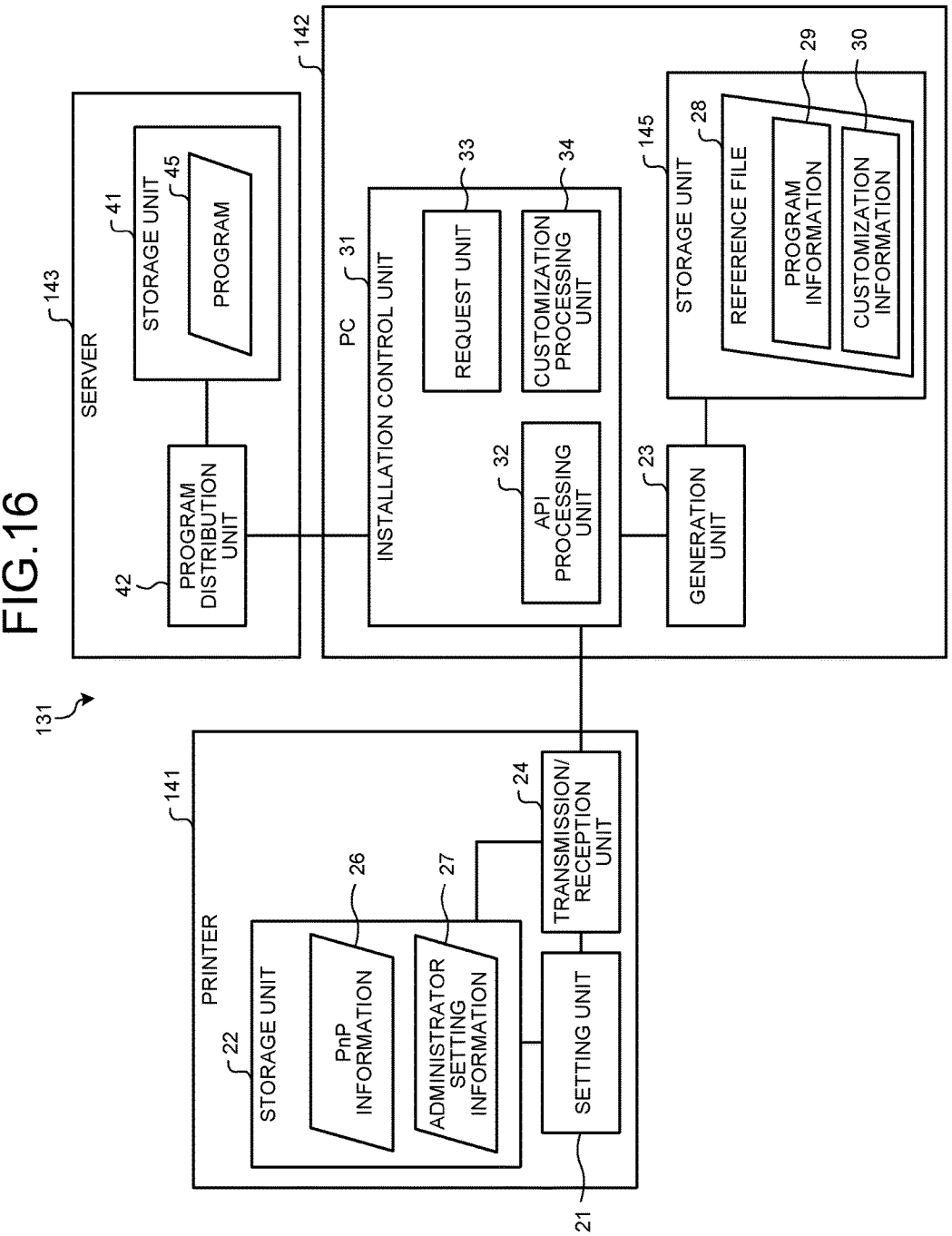
FIG. 16 is a diagram illustrating a functional configuration of a management system according to a third embodiment.

FIG. 16 is a diagram illustrating a functional configuration of a management system 131 according to a third embodiment. In this embodiment, the reference file 28 is stored in a storage unit 145 (second storage unit) of a PC 142, and the generation unit 23 is included in the PC 142. That is, in this embodiment, the program files 75A and 75B and the customization files 81A and 81B are generated in the PC 142.

Figure 17:
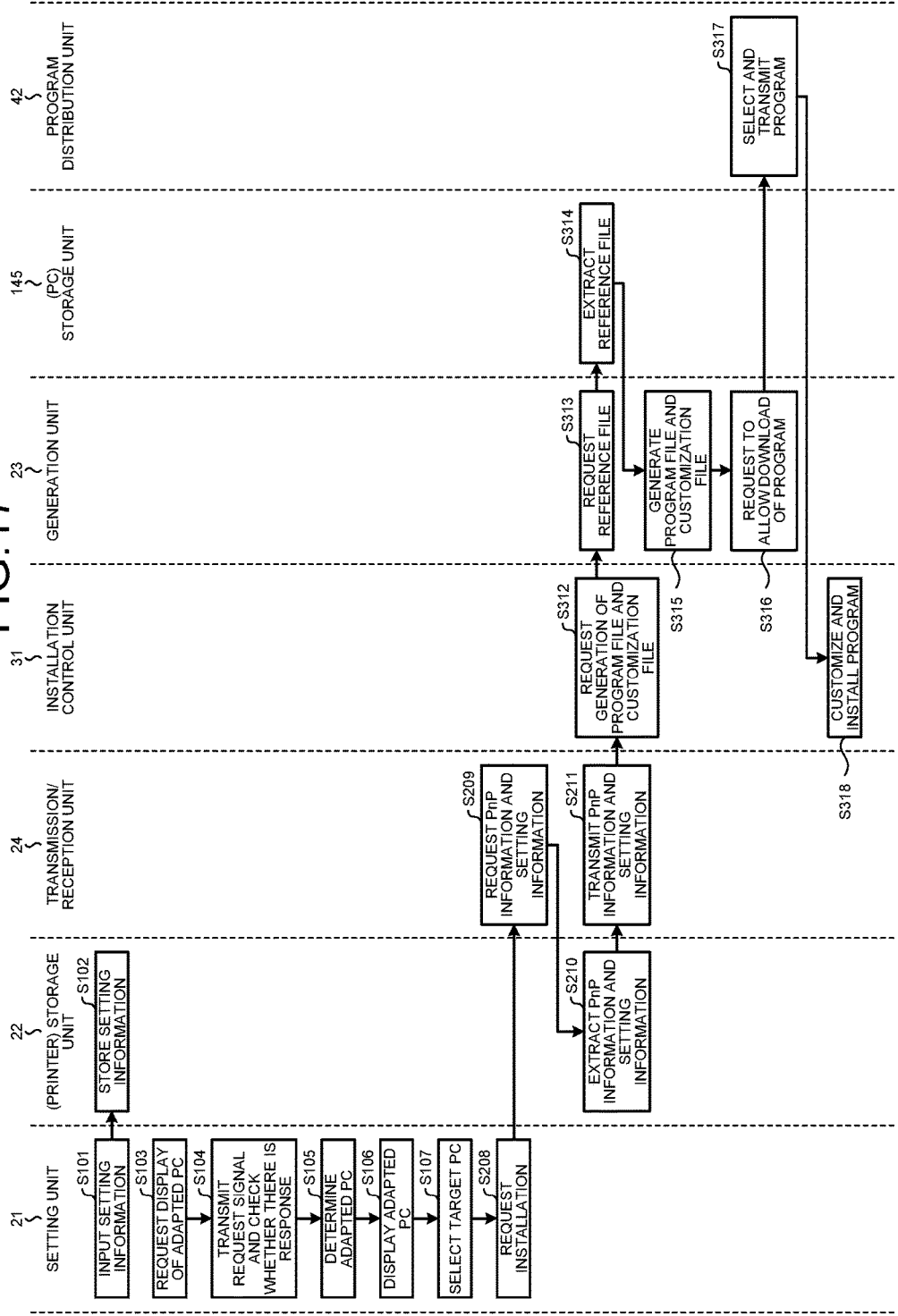
FIG. 17 is a flowchart illustrating a processing procedure of the management system according to the third embodiment.

FIG. 17 is a flowchart illustrating a processing procedure of the management system 131 according to the third embodiment. Steps S101 to S107 are the same as those in the first embodiment illustrated in FIG. 13, and Steps S208 to S211 are the same as those in the second embodiment illustrated in FIG. 15.

When the transmission/reception unit 24 of a printer 141 transmits the PnP information 26 and the administrator setting information 27 (S211), the installation control unit 31 of the PC 142 performs processing of requesting generation of the program files 75A and 75B and the customization files 81A and 81B (S312). When receiving the request signal from the installation control unit 31, the generation unit 23 performs processing of requesting extraction of the reference file 28 (S313), and the storage unit 145 of the PC 142 extracts the reference file 28 (S314).

The generation unit 23 generates the program files 75A and 75B and the customization files 81A and 81B based on the program information 29 and the customization information 30 included in the extracted reference file 28 (S315), and requests a server 143 to allow download of the program 45 designated by the program files 75A and 75B (S316). The program distribution unit 42 of the server 143 selects the program 45 in response to the request signal from the generation unit 23, and transmits the program 45 to the PC 12 (S317). The installation control unit 31 of the PC 12 changes the setting of the program 45 received from the server 143 based on the customization files 81A and 81B, and installs the program 45 (S318).

As in this embodiment, even with the configuration in which the PC 142 has a function of generating the program files 75A and 75B and the customization files 81A and 81B, the setting of the program 45 to be installed in the PC 142 can be adapted to the administrator setting performed in the printer 141 without putting an operational burden on the user.

Fourth Embodiment

Figure 18:
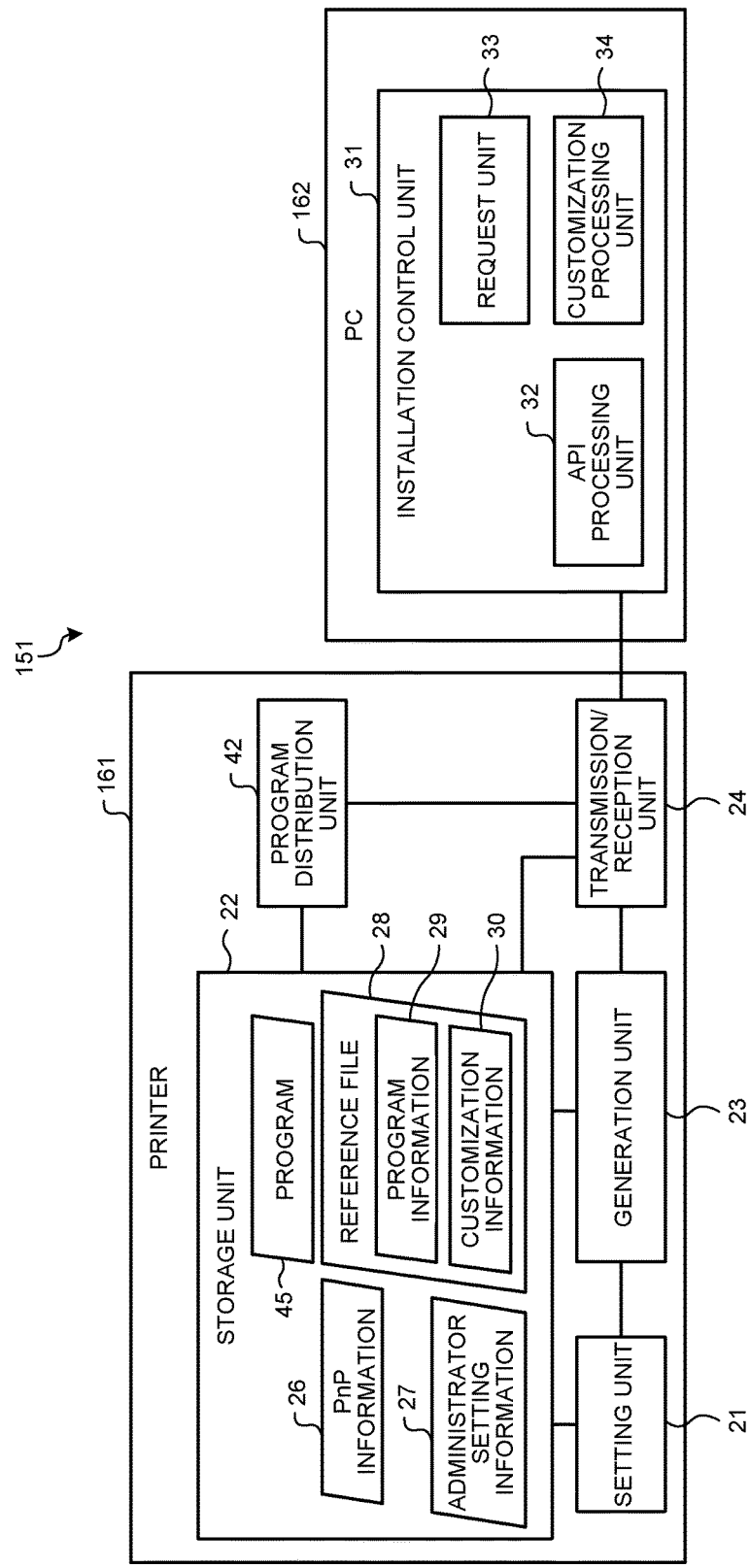
FIG. 18 is a diagram illustrating a functional configuration of a management system according to a fourth embodiment.

FIG. 18 is a diagram illustrating a functional configuration of a management system 151 according to a fourth embodiment. In this embodiment, the program 45 is stored in the storage unit 22 of a printer 161, and the program distribution unit 42 is included in the printer 161. That is, in this embodiment, the printer 161 has a function of distributing the program 45 to a PC 162.

FIG. 19 is a flowchart illustrating a processing procedure of the management system 151 according to the fourth embodiment. Steps S101 to S114 are the same as those in the first embodiment illustrated in FIG. 13.

After the storage unit 22 extracts the PnP information 26 (S114), the transmission/reception unit 24 of the printer 161 transmits the program files 75A and 75B generated by the generation unit 23 at Step S111 to the program distribution unit 42 (S415). The program distribution unit 42 performs processing of requesting extraction of the program 45 based on the received program files 75A and 75B (S416), and the storage unit 22 extracts the program 45 (S417).

The transmission/reception unit 24 transmits the extracted program 45, the customization files 81A and 81B generated at Step S111, and the PnP information 26 extracted at Step S114 to the installation control unit 31 of the PC 162 (S418). The installation control unit 31 changes the setting of the received program 45 based on the customization files 81A and 81B, and installs the program 45 (S419).

As in this embodiment, even in the system in which the server 13, 123, and 143 as in the first to the third embodiments are not included and the printer 161 has a function of distributing the program 45 to the PC 162, the setting of the program 45 to be installed in the PC 162 can be adapted to the administrator setting performed in the printer 161 without putting an operational burden on the user.

As described above, according to the present invention, the setting of a program to be installed in the information processing device can be adapted to the administrator setting performed in the image processing device without putting an operational burden on the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management system including an image processing device and an information processing device that requests the image processing device to perform printing processing via a network, the management system comprising a plurality of processors, amongst which one or more processors are configured by execution of one or more programs of instructions to:
    receive a setting for limiting an executable function of the image processing device; and
    receive, from the image processing device, function limiting information concerning the setting for limiting the executable function, and in response to receiving the function limiting information from the image processing device, acquire a program to request the image processing device to perform printing, and change, based on the received function limiting information, a setting concerning the printing processing in the program.

2. The management system according to claim 1, wherein the one or more processors are further configured to
    store therein Plug and Play (PnP) information used for processing of specifying the image processing device, the processing conforming to an application programming interface (API), and
    perform processing for specifying one or more adapted information processing devices that are the information processing devices in which software has been installed based on the API and the PnP information, and select a target information processing device from among the adapted information processing devices, the target information processing device being the information processing device in which the program is to be installed and the setting of the program is required to adapt to setting information indicating content of the setting for limiting the executable function of the image processing device.

3. The management system according to claim 2, wherein the software is resident software.

4. The management system according to claim 1, further comprising:
a server that distributes the program to the information processing device to request the image processing device to perform printing, wherein
the image processing device stores therein setting information indicating content of the setting for limiting an executable function of the image processing device and stores therein program infonnation indicating the program to request the image processing device to perform printing and customization information indicating how to change the setting concerning the printing processing of the program in accordance with the setting information, and
the server generates the limiting information based on the setting information, the program information, and the customization information.

5. The management system according to claim 1, wherein
the image processing device stores therein setting information indicating content of the setting for limiting an executable function of the image processing device and stores therein program information indicating the program corresponding to the image processing device based on the setting information and customization information indicating how to change the setting concerning the printing processing of the program in accordance with the setting information, and
the information processing device generates the limiting information based on the setting information, the program information, and the customization information.

6. The management system according to claim 1, wherein
the image processing device stores therein a driver, and
the image processing device extracts the program to request the image processing device to perform printing designated by the limiting information which is based on (i) setting information indicating content of the setting for limiting an executable function of the image processing device and (ii) on program information indicating the program to request the image processing device to perform printing to be distributed to the information processing device.

7. The management system according to claim 1, wherein the information processing device determines a program to be installed in the information processing device based on the limiting information, and the program that is acquired by the information processing device to request the image processing device to perform printing corresponds to the program to be installed in the information processing device based on the limiting information.

8. An information processing device in a system including an image processing device in which the information processing device requests the image processing device to perform printing processing via a network, wherein the system comprises a plurality of processors, amongst which one or more processors are configured by execution of one or more programs of instructions to:
receive a setting for limiting an executable function of the image processing device; and
receive limiting information concerning the setting for limiting the executable function from the image processing device via the network, acquire a program to request the image processing device to perform printing, and change, based on the received limiting information, a setting concerning the printing processing in the program,
wherein the image processing device stores therein a driver, and
the image processing device extracts the program to request the image processing device to perform printing designated by the limiting information which is based on (i) setting information indicating content of the setting for limiting an executable function of the image processing device and (ii) on program information indicating the program to request the image processing device to perform printing to be distributed to the information processing device.

9. A management method in a system including an image processing device and an information processing device that requests the image processing device to perform printing processing via a network, the system including a plurality of processors, amongst which one or more processors are configured by execution of one or more programs of instructions to perform the method comprising:
receiving a setting for limiting an executable function of the image processing device;
transmitting function limiting information concerning the setting for limiting the executable function from the image processing device to the information processing device via the network;
determining a program to be installed in the information processing device based on the function limiting information;
acquiring a program in the information processing device to request the image processing device to perform printing which corresponds to the program to be installed in the information processing device based on the function limiting information; and
changing, based on the received function limiting information, a setting concerning the printing processing in the program.

* * * * *